United States Patent [19]
Molzahn et al.

[11] 3,751,891
[45] Aug. 14, 1973

[54] IMPLEMENT TRANSPORT STRUCTURE

[75] Inventors: Herbert W. Molzahn; Donald K. Tashiro; Harold D. Ralph, all of Hamilton, Ontario, Canada

[73] Assignee: International Harvester Company, Chicago, Ill.

[22] Filed: Aug. 1, 1972

[21] Appl. No.: 277,011

[52] U.S. Cl. .............................. 56/228, 280/415 R
[51] Int. Cl. .......................................... A01d 75/22
[58] Field of Search ................. 56/228; 280/415 R, 280/415 A, 415 B; 172/240

[56] References Cited
UNITED STATES PATENTS
| | | | |
|---|---|---|---|
| 3,142,144 | 7/1964 | Ronning | 56/228 |
| 3,240,005 | 3/1966 | Rowse | 56/386 |
| 3,457,709 | 7/1969 | Killbery et al. | 56/11.9 |
| 3,515,408 | 6/1970 | Cagle | 280/415 R |
| 3,675,725 | 7/1972 | Schultz | 280/415 R |

*Primary Examiner*—Russell R. Kinsey
*Attorney*—Floyd B. Harman

[57] ABSTRACT

A pull-type crop harvester having a crop harvesting platform mounted on a wheeled frame. The platform is elongated transversely to the normal forward direction of travel during a crop harvesting operation. The frame includes a hitch tongue connectible to the towing tractor. The hitch tongue is pivotable to a position transverse to the forward direction of travel. A transport wheel is carried on the hitch tongue for engaging the ground when the hitch tongue is in the transverse position whereby the crop harvester may be towed in an endwise direction. An auxiliary hitch pole is connectible between an end of the harvester and the tractor for the endwise transport.

15 Claims, 6 Drawing Figures

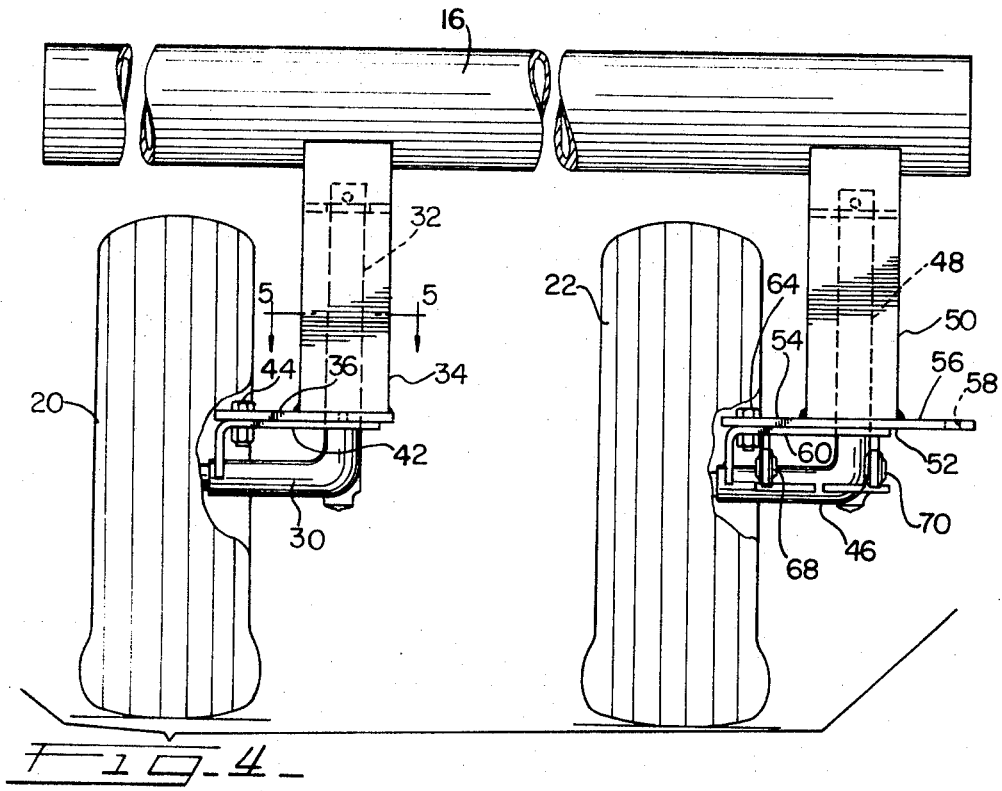
Fig. 4
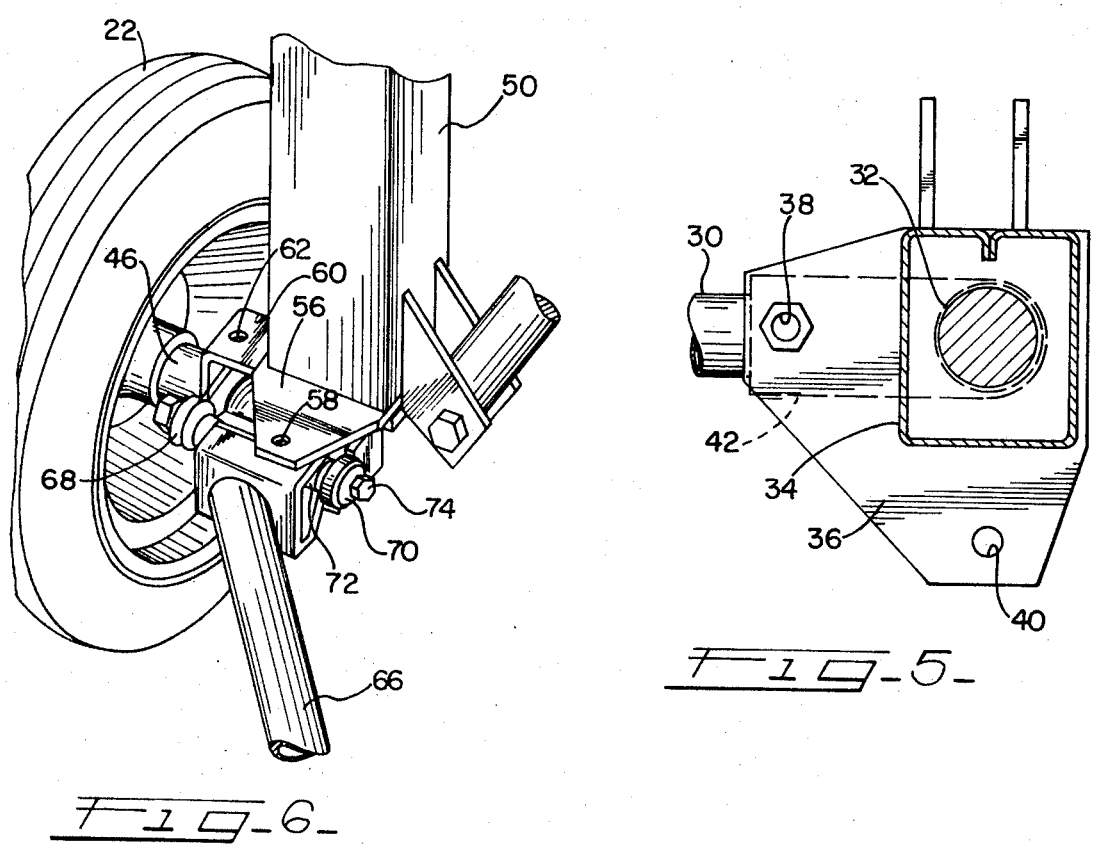
Fig. 6
Fig. 5

IMPLEMENT TRANSPORT STRUCTURE

BACKGROUND OF THE INVENTION

1. Field of the Invention

The invention relates generally to agricultural implements adapted to be towed behind a tractor and more particularly to an implement having structure by which the implement can be towed in an endwise direction.

2. Prior Art

The transverse length of crop harvesting machines such as pull-type windrowers is such as to present difficulties in transporting the machine along the roadways and through narrow gates between harvesting operations. A wide variety of means have been employed by which machines can be converted for endwise transport. Many involve considerable dismantling and reassembling of transport structure requiring undue time and effort. In some systems the wheels which support the implement during normal operation and forward transport, are not useable for endwise transport. Such wheels are not useable to the full potential, thereby increasing costs on a time-use basis. Examples are shown in U.S. Pat. Nos. 1,872,121, 2,696,772, and 2,833,105.

SUMMARY OF THE INVENTION

The invention relates to a wheel supported implement having a draft tongue connectible to a towing tractor. The draft tongue is pivotable from a forwardly extending operative position to a transversely extending transport position. A transport wheel is mounted on the draft tongue and is shiftable into a ground engaging position to rollably support the implement when the draft tongue is in the transport position. The wheels supporting the implement for normal forward operation are shiftable so as to be effective in conjunction with the transport wheel for rollably supporting the implement for endwise transport.

The invention is characterized by the ease with which the implement can be converted between the operative and transport modes. The simplicity of the construction and arrangement on the transport structure contributes to the ease of convertability. For example, the transport wheel is conveniently accessible for shifting movement between its raised and grounded engaging positions due to its being mounted on the draft tongue of the implement.

Briefly, the objects of the invention are to provide an implement: which is readily converted between operative and transport modes; and which includes a transport structure of simple construction and ready accessibility.

BRIEF DESCRIPTION OF DRAWINGS

FIG. 4 is an enlarged fragmentary elevation showing ground support wheels of the implement;

FIG. 5 is an enlarged sectional view taken in the direction of arrows 5—5 of FIG. 4; and FIG. 6 is a fragmentary enlarged perspective view of an auxiliary hitch pole connected to the steerable wheel for endwise transport of the implement.

DESCRIPTION OF THE PREFERRED EMBODIMENT

Figure 1:
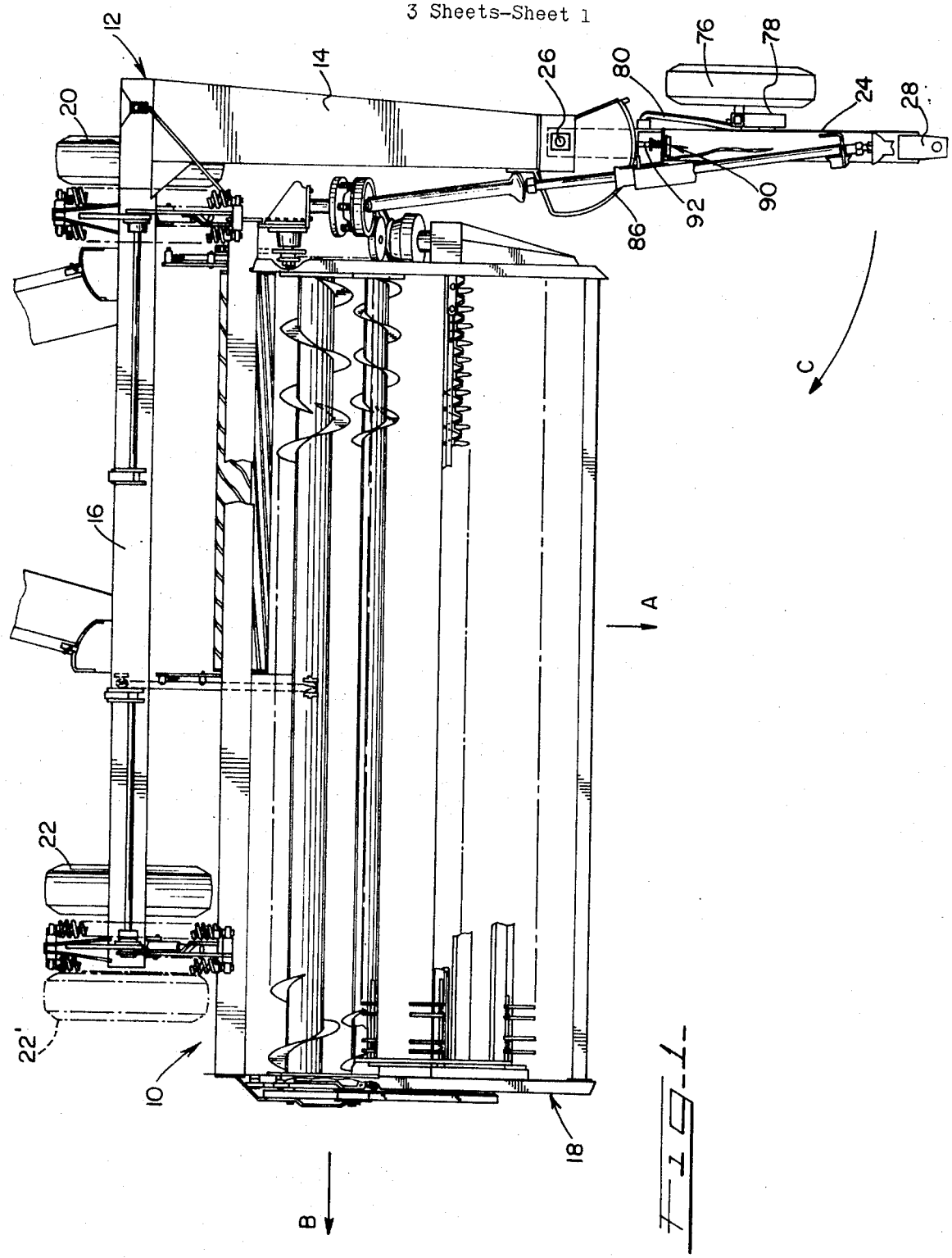
FIG. 1 is a plan of the implement disposed for operation.

Referring first to FIG. 1 there is shown a pull-type windrower 10 which includes a wheel-supported L-shaped main frame 12 having a forwardly-extending leg 14 and a transversely extending leg 16. The leg 16 is rigidly connected to the rear of the leg 14 to form the L-shaped structure. A crop harvesting platform 18 is supported from the frame 12 so as to be disposed forwardly at the leg 16 and adjacent to the leg 14. The platform 18 preferably includes the components necessary to cut, consolidate, condition, and deposit the crop onto the ground in a windrow.

The frame 12 is movably supported on a pair of wheels, one of which being shown at 20 disposed beneath the leg 16 approximate to the juncture thereof with the leg 14. The other wheel is shown at 22 disposed beneath the leg 16 near the outer end thereof. In order to pull the windrower in the forward direction of travel shown by the arrow A, a hitch tongue 24 is pivotally connected at 26 to the forward end of the leg 14. Suitable hitch structure 28 is mounted on the forward end of the tongue at 24 to couple the windrower to a towing tractor.

In accordance with the invention the above described implement includes means facilitating quick and easy conversion for endwise transport in the direction of arrow B. As shown in FIGS. 4 and 5 the wheel 20 is journaled on a spindle 30 which includes a vertical portion 32. The portion 32 is journaled within a housing 34 welded to the frame leg 16 and extending vertically downwardly therefrom.

Figure 2:
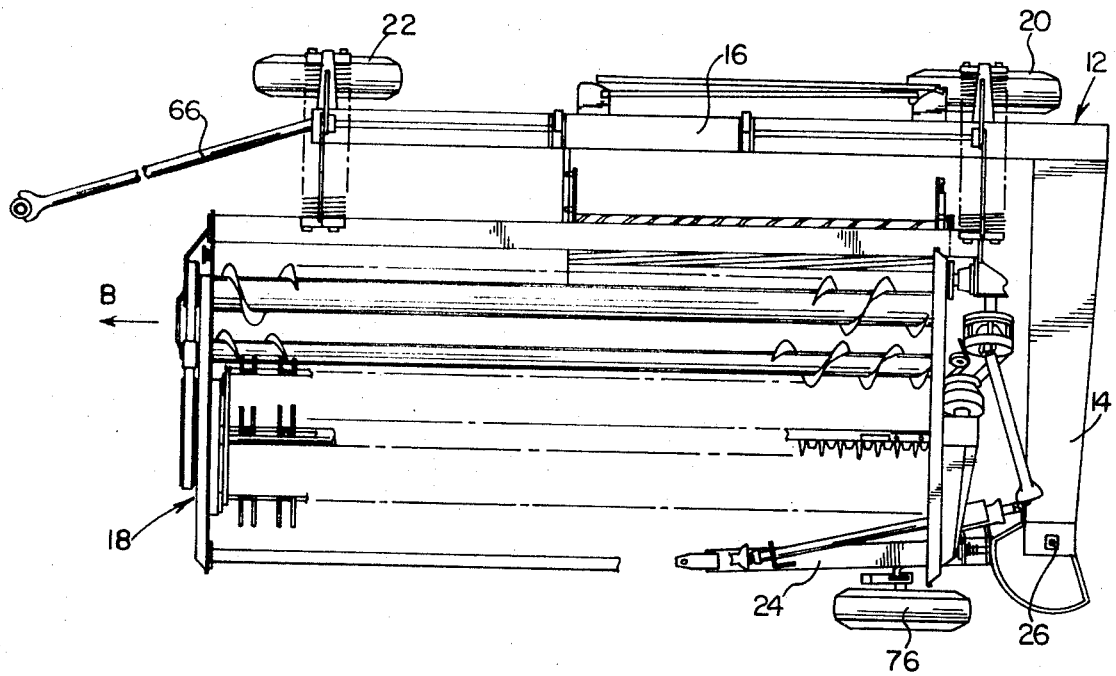
FIG. 2 is a plan view of the implement disposed for endwise transport.

Means are provided by which the wheel 20 may be selectively retained in the forward position shown in FIGS. 1 and 4 and in a transverse position shown in FIG. 2. As shown in FIGS. 4 and 5 a flat plate 36 is welded to the bottom end of the housing 34 and includes portions extending transversely and rearwardly through which respective openings 38 and 40 are defined at 90° from each other on an arc about the center of the spindle portion 32. Another plate 42 is welded to the spindle 30 beneath the plate 36. It will be understood that an opening is defined through the plate 42 at the same distance from the center of the spindle portion 32 as the openings 38 and 40 so as to be selectively registerable therewith. A bolt assembly 44 is insertable through the aligned openings in the plates 36 and 42 to retain the wheel 20 in either the forward or transverse position.

The other ground wheel 22 of the windrower may be disposed in either of two parallel positions for forward movement as shown in solid lines and dotted lines in FIG. 1. In addition, the wheel 22 is adapted to be steerably coupled to a towing tractor for endwise transport of the windrower. The wheel 22 is journaled on a spindle 46 (FIGS. 4 and 6) which includes a vertical portion 48. The portion 48 is journaled within a housing 50 welded to the frame leg 16 near the outer end thereof and extending vertically downwardly therefrom in the same manner as the housing 34.

A flat plate 52 is welded to the bottom end of the housing 50 and includes portions 54 and 56 on opposite sides respectively of the housing 50. Each of the portions 54 and 56 includes an opening defined therethrough (one such opening being shown at 58 through the portion 56) at an equal distance from the center of the spindle portion 48.

A plate 60 is welded to the spindle 46 so as to be disposed beneath the plate 52. An opening 62 is defined through the plate 60 so as to be registerable with either of the openings in the plate 52 when the entire wheel is shifted about the axis of the spindle portion 48. A bolt assembly 64 is insertable through the aligned openings in the plates 52 and 60 to retain the wheel 22 in either the solid line or dotted line forwardly directed positions shown in FIG. 1.

In order to provide steerable control of the windrower for endwise towing, an auxiliary hitch pole 66 is adapted for removable coupling to the wheel 22. A pair of axially aligned socket members 68 and 70 are secured to the spindle 46 as shown. The inner end of the hitch pole 66 includes a sleeve portion 72 positionable between and aligned with the socket members 68 and 70. An elongated bolt 74 is received through the socket members and the sleeve portion to removably couple the hitch pole 66 to the wheel assembly and to provide a horizontal pivot for the hitch pole.

Figure 3:
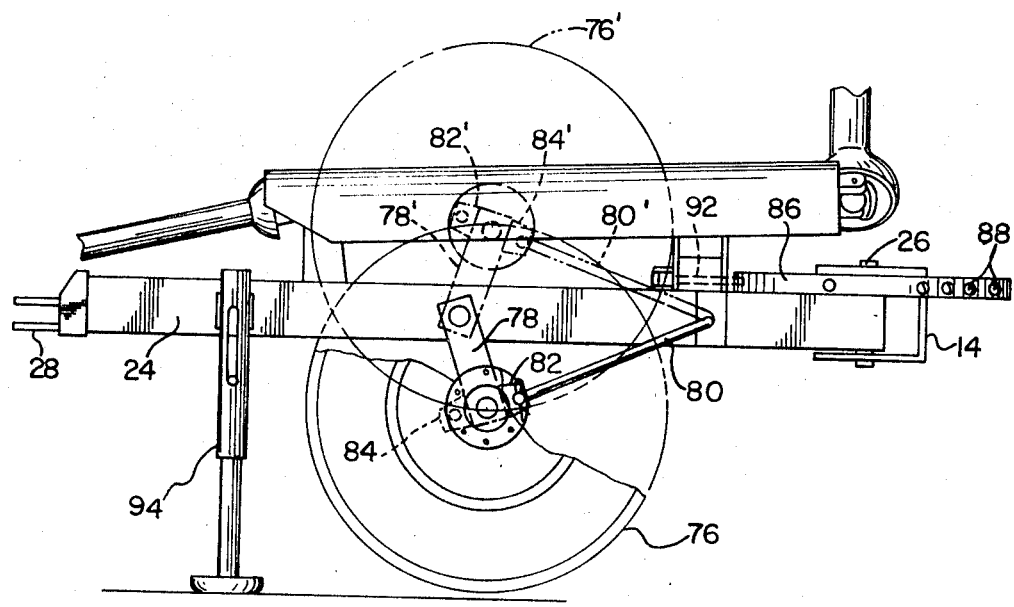
FIG. 3 is an enlarged fragmentary elevation showing the draft tongue and transport wheel of the implement.

In accordance with a feature of the invention, the normally operative draft tongue 24 is constructed and arranged to include means for rollably supporting the forward portion of the windrower frame during endwise transport of the machine. As best shown in FIG. 3 a transport wheel 76 is journaled on the end of an arm 78, the opposite end of which is swingably mounted on a side of the tongue 24. A rod 80 is pivotally supported from a side of the tongue 24 and extends forwardly into removable connection with either of a pair of flanges 82 and 84 projecting oppositely from an end of the arm 78. It will thus be seen that the transport wheel 76 is selectively positionable in a ground engaging position and a raised transport position shown in solid lines and dotted lines respectively.

The pivot connection 26 of the draft tongue 24 to the frame leg 14 is preferably disposed close to a line extending along the forward edge of the harvester platform 18. Accordingly the tongue 24 may be pivoted to a position shown in FIG. 2 wherein the tongue extends generally along the forward edge of the platform so as to dispose the transport wheel 76 parallel with the wheel 20 when in its transport position. The forward end of the frame leg 14 includes an arcuate section 86 defined generally about the axis of the pivot connection 26. A plurality of openings 88 is defined through the arcuate section 86 for selective engagement by a latch assembly 90. The assembly 90 includes a rod 92 which is spring biased into engagement with the section 86 so as to automatically extend into any one of the various openings 88 as the rod 92 becomes aligned therewith. Accordingly the tongue 24 may be held in a variety of positions for operation and transport. A conventional extensible jack 94 is mounted on the draft tongue 24 for supporting the windrower during coupling to the tractor and conversion to endwise transport.

In operation, the hitch 28 is coupled to a tractor for towing the windrower in field operation or in transport in the forward direction of arrow A. The ground wheel 22 may be set in either the solid line or dotted line position of FIG. 1 as desired by bolting the plate 60 to the plate portion 54 or 56 respectively as shown in FIG. 4. During field operation the various components of the harvesting platform 18 will cut, consolidate, condition, and deposit the crop onto the ground in a windrow.

The conversion for endwise transport requires a minimum of time and effort. The latch rod 92 is actuated out of engagement with the arcuate section 86 to free the draft tongue 24 for movement about the pivot connection 26. The tractor is then driven rearwardly at an angle to swing the tongue 24 as far as practical in the direction of arrow C. The jack 94 is extended to support the draft tongue 24 and the hitch 28 is uncoupled from the tractor. The transport wheel 76 is lowered by uncoupling the rod 80 from the flange 84, permitting the support arm 78 and wheel 76 to swing downwardly, and then coupling the rod 80 to the other flange 82. The jack 94 is raised out of contact with the ground to thus lower the wheel 76 into ground engagement.

The windrower is then pushed generally forwardly with the wheel 76 serving as a reaction point on the ground against which the tongue 24 swings as it pivots about the connection 26. This movement is continued until the tongue 24 has assumed the position shown in FIG. 2. The latch rod 92 will then lock the tongue in this transport position. It will be seen with reference to FIG. 2 that in the preferred embodiment of the implement, the platform 18 is raisable to a position permitting the draft tongue 24 to be disposed beneath the leading edge of the platform.

The bolt assemblies 44 and 64 of the wheels 20 and 22 respectively are uncoupled to free the wheels for swinging movement about the axes of the respective spindle portions 32 and 48. The wheel 20 is then swung to the position shown in solid lines in FIG. 2 so as to be disposed in parallel with the transport wheel 76. The wheel 20 is locked in this transport position by bolting the plate 42 to the plate 36 through the opening 40 (FIG. 5). The hitch pole 66 is then coupled to the wheel assembly 22 and coupled to the tractor for endwise transport of the windrower.

It will thus be seen that the windrower is movably supported on the wheels 20, 22 and 76, with the wheel 22 providing the steering control. The conversion from the transport mode back to the operational mode simply involves reversing the above described procedure.

What is claimed is:

1. In a crop harvester having a wheel-supported L-shaped main frame which includes a first leg disposed longitudinally of the forward direction of travel of the harvester and a second leg extending transversely to said direction from the rear of the first leg, a crop harvesting platform supported from said frame adjacent to said first and second legs thereof, wherein the improvement comprises: a hitch tongue pivotally connected to the forward end of said first leg for pivotable movement between a first position extending forwardly from said first leg and a second position extending substantially parallel to said second leg; and a transport wheel mounted on said hitch tongue for rollably supporting said harvester for transport in a direction transverse to the forward direction of travel when said hitch tongue is in said second position.

2. The subject matter of claim 1, wherein said hitch tongue in said second position is disposed along the forward portion of said platform.

3. In a crop harvester adapted for towing behind a tractor, the harvester including a generally horizontal L-shaped frame consisting of a forwardly extending first leg and a transversely extending second leg joined to the rear of said first leg, a pair of ground wheels supporting said frame, a crop harvesting platform supported on said frame forwardly of said second leg, wherein the improvement comprises: a hitch tongue connected to the forward end of said first leg and having a forward end adapted to be coupled to the tractor for towing the harvester forwardly during a harvesting operation; means mounting said hitch tongue on said first leg for pivotable movement about a generally vertical axis to a transport position generally parallel to said second leg and along the front of said platform; and a transport wheel mounted on said hitch tongue for rollably supporting the harvester for movement transversely to the forward direction of travel when said hitch tongue is in said transport position.

4. The subject matter of claim 3, including a transport hitch pole connectable to one of said ground wheels for towing the harvester transversely to the forward direction of travel.

5. The subject matter of claim 3, including means for raising and lowering said transport wheel relative to said hitch tongue between raised and ground-engaging positions, respectively.

6. The subject matter of claim 4, including means for selectively retaining the other of said pair of ground wheels in a position parallel to said transport wheel when said hitch tongue is disposed in said transport position.

7. A mobile implement adapted for towing behind a tractor in either a forward operative direction or an endwise transport direction, said implement comprising: a generally horizontal frame having a first leg disposed forwardly and a second leg disposed transversely from the rear of said first leg to define an L-shaped configuration for said frame; a first ground wheel supporting said frame proximate to the juncture of said first and second legs; a second ground wheel supporting said frame proximate to an end of said second leg disposed away from said juncture; a hitch tongue connected to the forward end of said first leg for coupling to the tractor for towing the implement in the forward direction; means mounting said hitch tongue on the forward end of the first leg for pivotable movement about a generally vertical axis to a transport position generally parallel to said second leg; and a transport wheel mounted on said hitch tongue for rollably supporting the implement for endwise transport when said hitch tongue is in said transport position.

8. The subject matter of claim 7, including means for shifting said first ground wheel to a position parallel to that of said transport wheel when said hitch tongue is in said transport position.

9. The subject matter of claim 7, including means mounting said second ground wheel for swinging movement about a generally vertical axis; and an auxiliary hitch pole connectable to said second ground wheel for controlling the direction thereof and connectable to the tractor, whereby the implement may be towed for transport in the endwise direction.

10. The subject matter of claim 7, including means for shifting said first ground wheel to a position parallel to that of said transport wheel when said hitch tongue is in said transport position; means mounting said second ground wheel for swinging movement about a generally vertical axis; and an auxiliary hitch pole connectable to said second ground wheel for controlling the direction thereof and connectable to the tractor, whereby the implement may be towed for transport in the endwise direction.

11. The subject matter of claim 7, including means for selectively retaining said transport wheel in raised and ground-engaging positions to provide for forward movement and endwise movement respectively of the implement.

12. In a harvester adapted for towing behind a tractor and having an elongated frame with its length transverse to the operative line of advance, a pair of wheels supporting said frame proximate to the rear thereof, a draft tongue extending forwardly from the frame proximate to one end of the frame and adapted for coupling to the tractor, wherein the improvement comprises: means mounting said draft tongue for repositioning to extend transversely to the line of advance and toward an end of the frame opposite to said one end; and a transport wheel mounted on said draft tongue for rollably supporting the forward portion of said frame when said draft tongue is disposed transversely to the line of advance.

13. The subject matter of claim 12, wherein said pair of wheels includes a first wheel proximate to said one end of said frame; and means for selectively retaining said first wheel for rolling movement in a transverse direction parallel to said transport wheel.

14. The subject matter of claim 12, wherein said pair of wheels includes a second wheel proximate to said opposite end of said frame; means mounting said second wheel for swinging movement about an upright pivot axis; a tow bar adapted to be connected to a tractor; and means for detachably connecting said tow bar to said second wheel for steerable control of the harvester for transport in directions transverse to the operative line of advance.

15. The subject matter of claim 12, wherein said pair of wheels includes a first wheel proximate to said one end of said frame; means for selectively retaining said first wheel for rolling movement in a transverse direction parallel to said transport wheel; said pair of wheels further including a second wheel proximate to said opposite end of said frame; means mounting said second wheel for swinging movement about an upright pivot axis; a tow bar adapted to be connected to a tractor; and means for detachably connecting said tow bar to said second wheel for steerable control of the harvester for transport in directions transverse to the operative line of advance.

* * * * *